United States Patent [19]

Henry

[11] 4,285,046

[45] Aug. 18, 1981

[54] CORRELATION METHOD

[75] Inventor: Robert M. Henry, Sowerby Bridge, England

[73] Assignee: National Research Development Corporation, London, England

[21] Appl. No.: 46,322

[22] Filed: Jun. 7, 1979

[30] Foreign Application Priority Data

Jun. 16, 1978 [GB] United Kingdom ............... 27145/78

[51] Int. Cl.³ .................... G06F 15/336; G06F 15/20
[52] U.S. Cl. ................................... 364/728; 364/510; 364/569
[58] Field of Search ............... 364/604, 728, 819, 510, 364/569; 340/146.2

[56] References Cited

U.S. PATENT DOCUMENTS

| | | | |
|---|---|---|---|
| 3,249,911 | 5/1966 | Gustafsson | 364/728 X |
| 3,331,955 | 7/1967 | Norsworthy | 364/819 |
| 3,777,133 | 12/1973 | Beck et al. | 364/728 |
| 3,818,231 | 6/1974 | Gopal et al. | 364/510 X |
| 4,019,038 | 4/1977 | Critten et al. | 364/728 |
| 4,121,297 | 10/1978 | Smith | 364/728 |

FOREIGN PATENT DOCUMENTS

| | | | |
|---|---|---|---|
| 1473006 | 3/1967 | France | 364/728 |
| 2629740 | 6/1978 | Fed. Rep. of Germany | 364/728 |

Primary Examiner—Felix D. Gruber
Attorney, Agent, or Firm—Cushman, Darby & Cushman

[57] ABSTRACT

Two binary signals are compared by providing time signals to indicate the respective times at which the signals change their state, usually in the form of digital data strings corresponding to the times at which the signals change their state, and the two time signals are cross correlated. For example, if the two binary signals are in the same state between two consecutive times of the two data strings, a running total of time increments is increased by the numerical difference between the two times; if the two binary signals are in opposite states, the running total is decremented by the numerical difference. In a particular example the two binary signals are derived from two sensors spaced in the direction of flow of a flowing fluid; one binary signal is time shifted by adding or subtracting a series of numbers of increments; each time shifted signal and the other signal are cross correlated; and the transit time of the flow between the sensors is given by the time shift corresponding to the highest running total.

10 Claims, 10 Drawing Figures

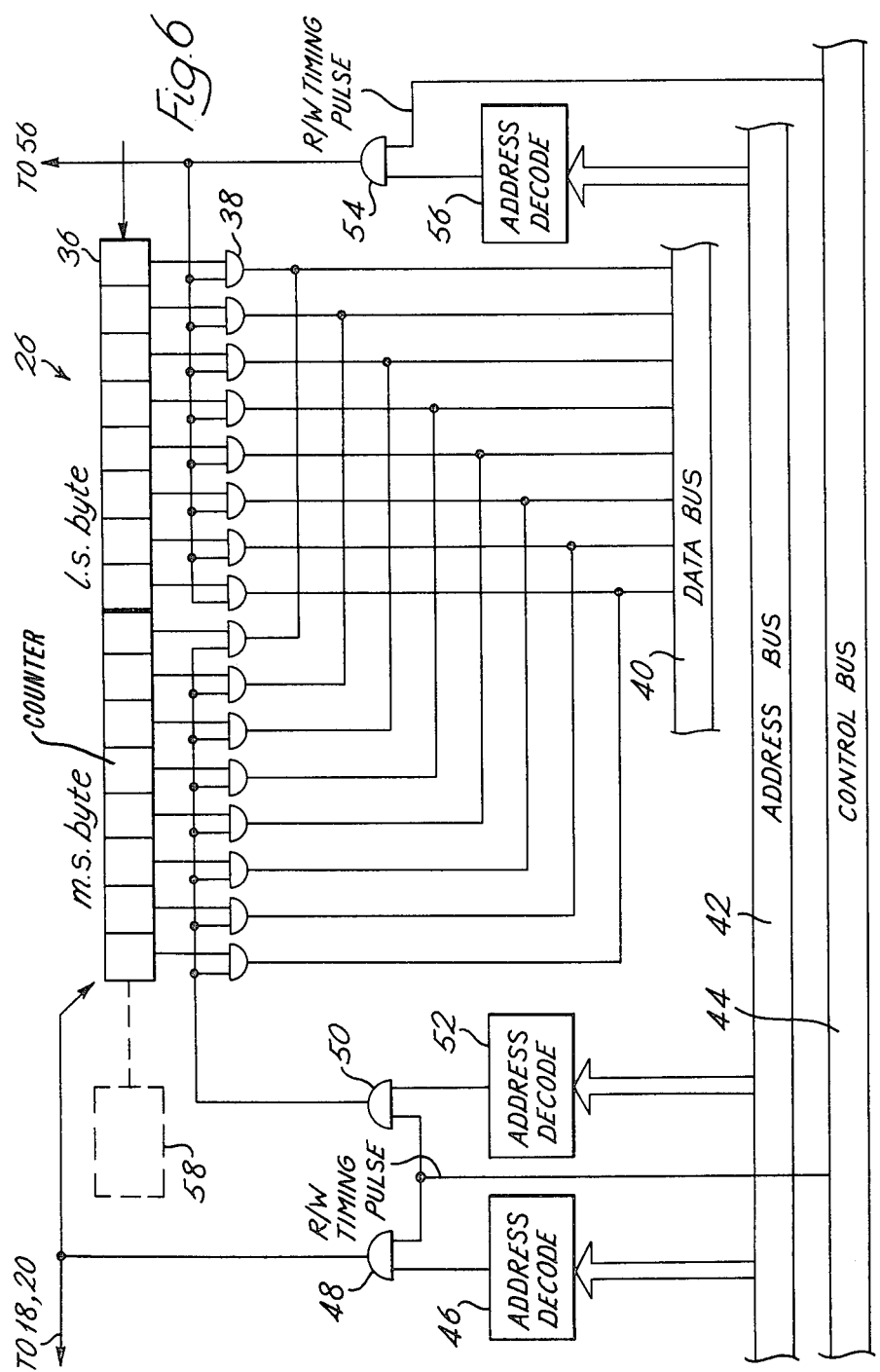

CORRELATION METHOD

This invention relates to an improved apparatus for comparing two signals using information relating to the correlation function of the two signals.

An important application of such an apparatus arises in connection with certain known methods of flow measurement in which flow velocity is determined by identifying by cross correlation the time delay between two noise signals, this time delay being inversely proportional to the flow velocity. Recent developments relate to the determination of the polarity correlation function of the noise signals, for example as described in the specification of UK Pat. No. 1401009; such a determination involves quantisation of the noise signals and regards signals greater than a preset threshold as logic '1' and signals below this threshold as logic '0'. This simplifies the computation process, so that computation time can be reduced even when long integration periods are used to compensate for the coarseness of the quantisation.

At high sampling rates, dictated by demands for resolution, the binary data strings are long with relatively infrequent transitions. Although the information content is related to the number of transitions the computational effort is related to the number of samples.

It is an object of the present invention to reduce the number of computations required to determine the polarity correlation function of two binary signals, and thus to reduce the computation time while maintaining accuracy.

According to the invention, apparatus for comparing two binary signals comprises timing means arranged to indicate the respective times at which each binary signal changes its state; and calculation means for calculating from said times information relating to the polarity correlation function of the two binary signals.

Conveniently the apparatus comprises counting means for counting equal increments of time; and control means for changing the operation of the counting means between an addition mode and a subtraction mode whenever only one binary signal changes its state.

Usually the increments of time between any two consecutive changes in the state of the binary signals will be added when the binary signals are in the same state between those times, e.g. both present or both absent, and will be subtracted when the binary signals are in opposite states, but alternatively the increments could be subtracted when the binary signals are in the same state. The relative states of the binary signals need be known only at the times of the first change of state of one signal.

Such an apparatus may be used to sense the amount of distortion of a signal caused by passage through an apparatus, by comparison of the signals before and after such passage, and calculation of, for example, the value of the polarity correlation function. For example the bandwidth may be checked, or the apparatus may be used for spectral analysis or signature analysis in both rotating and reciprocating machinery.

Also, as is conventional in cross correlation apparatus, apparatus according to the invention may be used in the derivation of the time delay between two related signals, by the application to one signal of a plurality of different time shifts, and determination of the time shift which corresponds to the highest value of the polarity correlation function. Such a time delay may be used in the determination of flow rates of a fluid; the binary signals will then be derived from the outputs of two sensors spaced in the direction of flow, the sensors sensing fluctuations in a property of the fluid such as density or concentration of entrained particles. Either the sensors provide an output in binary form, when the sensed property has a value above or below a predetermined level, or the sensors provide a noise signal, which is converted to binary form depending on whether its amplitude is above or below a predetermined level.

The invention will now be described by way of example only with reference to the accompanying drawings, in which:

FIG. 1($b$) shows one signal time-shifted with respect to the other;

FIG. 1($c$) illustrates the cross correlation function of the two signals;

FIG. 6 shows the interfacing of the clock shown in FIGS. 3 and 5;

As stated above, noise signals can be received from a flowing fluid at two positions spaced in the direction of flow by any type of suitable sensor, and cross correlated to give flow velocity. For example fluctuations in light reflected by the surface of a liquid in an open channel can be sensed, or fluctuations in ultrasonic radiation transmitted diametrically across a pipe containing a flowing fluid can be sensed. The present invention can be applied to any such noise signals.

Suppose such a noise signal is sampled at regular time intervals and converted to a binary code, depending on whether the noise amplitude is above or below a predetermined threshold level. Then the information will be in the form of a string of binary numbers, possibly with blocks of '0's and '1's together. Information in this form can be handled by a polarity correlator. However, such a binary data string can also be represented by the transitions 0–1 and 1–0. For example the binary data string:

```
1 1 1 1 0 0 0 1 1 1 1 1 1 0 0 0 0 0 0 1 1 1 0 0
    4       7           13              19    22

(0100) (0111)        ...        ...    ...
``` in digital data string form. It will be appreciated that no information is lost by this transformation, although the number of items of information is significantly reduced. In the present invention two digital data strings in this form are correlated.

Suppose there are two identical transducers spaced in the direction of flow and having the same predetermined threshold level. Suppose, for clarity, that the noise signals are of pseudo random binary form, and do not change between the transducers, other than by the application of a time delay. (In practice there will be considerable changes but a statistical resemblance will remain.) If the upstream transducer is labelled CAUSE and the downstream transducer is labelled EFFECT (there is no true cause and effect but this nomenclature indicates the direction of the time shift), then the EFFECT noise signal will be essentially the CAUSE noise signal having a time delay depending on the transit time of the sensed fluctuations between the two sensors. Consider the digital data strings:

| CAUSE  | 0   | 30  | 50  | 60  | 90  | 100 | 110 | 120 | 130 | 170  | 180 | 200 | 210 |
|--------|-----|-----|-----|-----|-----|-----|-----|-----|-----|------|-----|-----|-----|
|        | 220 | 240 |     | 260 | 310 | 340 | 360 | 370 | 400; | and |     |     |     |
| EFFECT | −15 | 35  | 65  | 85  | 95  | 125 | 135 | 145 | 155 | 165  | 205 | 215 |     |
|        | 235 | 245 | 255 | 275 |     | 295 | 345 | 375 | 395 | 405  | 435.|     |     |

It will be seen by inspection that EFFECT is CAUSE delayed by 35 time intervals. It is this delay time, the transit time, which must be determined.

Figure 1A:
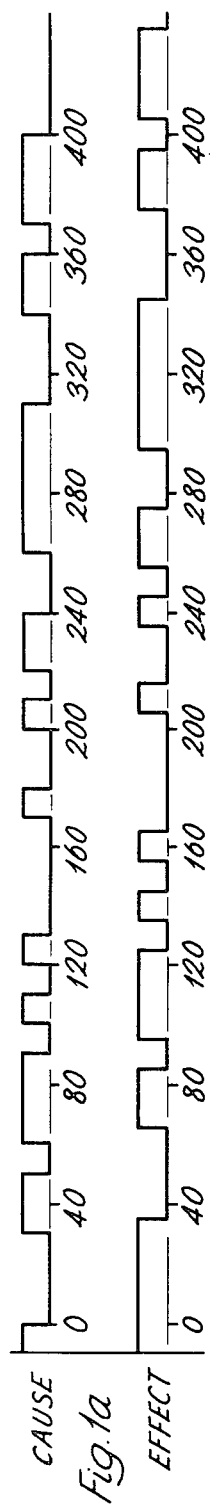
FIG. 1($a$) shows in graphical form two pseudo-random binary signals which are to be cross correlated.
Figure 1B:
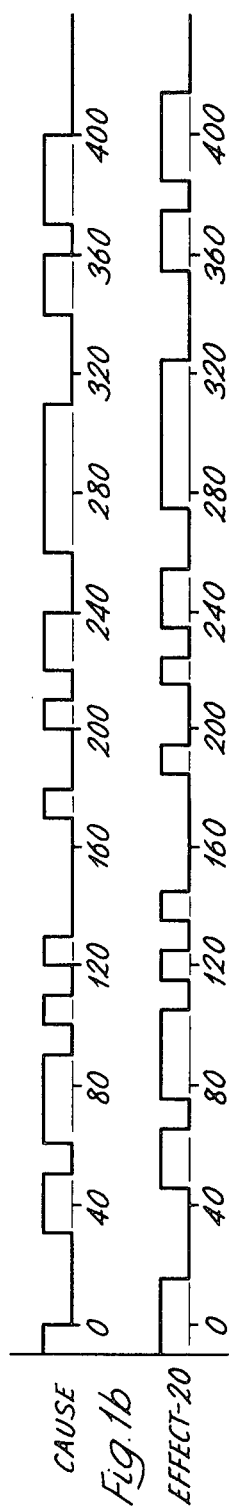

The two data strings are illustrated in FIG. 1(a) and in FIG. 1(b) CAUSE is shown with EFFECT shifted by I=20 intervals of time. It will be seen from FIG. 1 that if EFFECT is shifted by I=35 intervals of time, the correct transit time, then both signals will be present or absent, corresponding to binary '1' and binary '0', in each individual time interval, giving a perfect match of the signals. If a count, or running total, is made of the number of time intervals in which both signals are in the same state, then the total would equal the number of time intervals over which the count is made. If the signals do not match exactly, then a sum lower than the total possible count will be given; the higher the sum as percentage of the possible count, the better the correlation. If the count is zero, then there is zero correlation between the two signals. If it is negative then there is an inverse correlation.

In practice, the digital data strings are stored, and a correlation calculation is made for several different time shifts, I, applied to EFFECT; the highest correlation corresponds to the correct transit time. For each correlation, a number corresponding to the number of time intervals equal to the time shift I is subtracted from the EFFECT data and a running total calculated.

Figure 2:
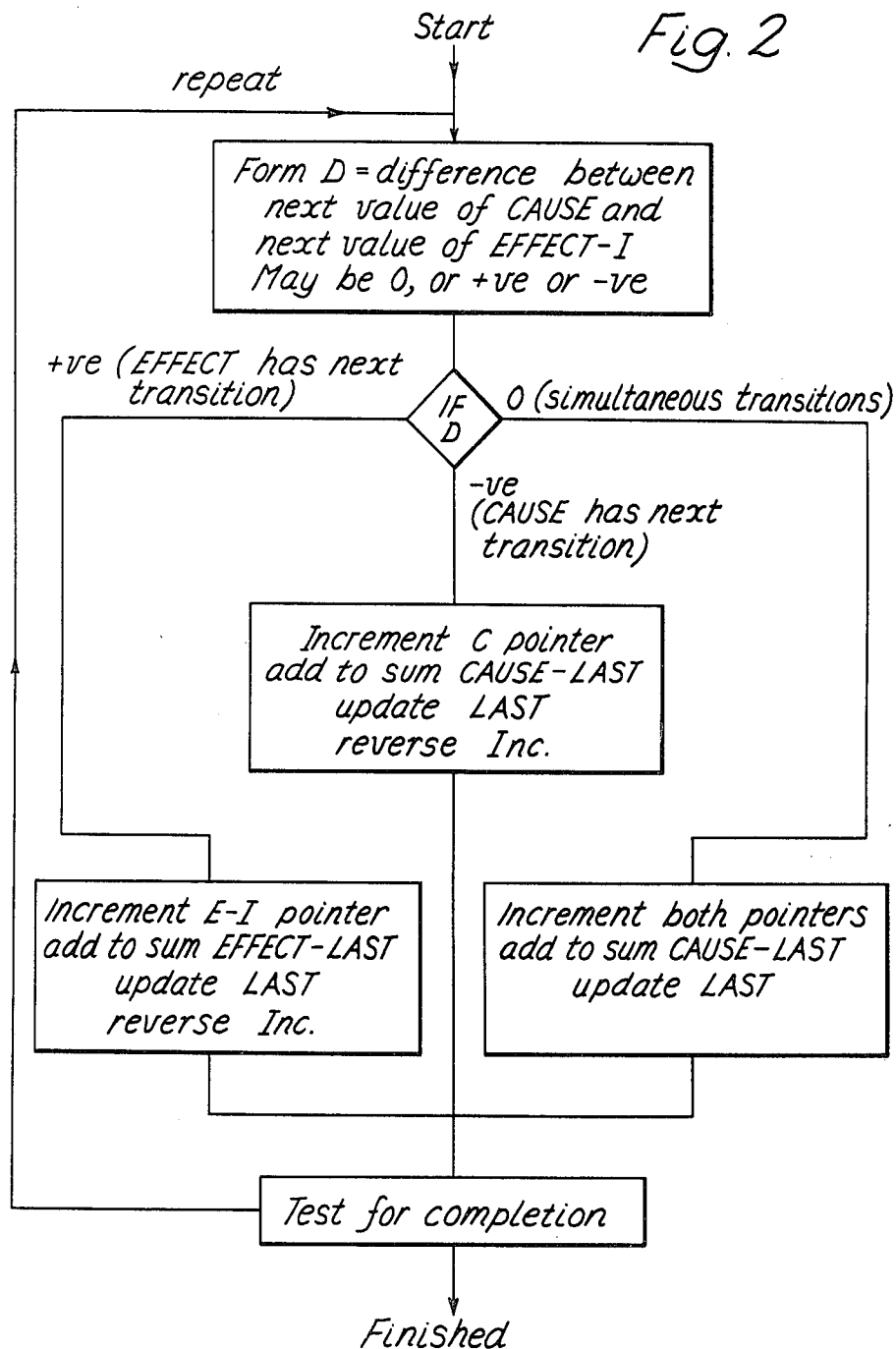
FIG. 2 shows the algorithm by which the correlation computation is made.

An algorithm by which each value of (EFFECT-I) can be cross correlated with CAUSE is shown in FIG. 2. The calculation proceeds by moving a pointer along each data string, each pointer stopping at every number in that string, the numbers corresponding to the cross-over points of the respective binary signal. Considering again FIG. 1(b) the first transition is in CAUSE at time $t_1=0$; however, this is a negative-going transition which is not used because the correlation function would then be computed upside down. The apparatus is arranged so that the first stored transition in each data string is positive-going. In FIG. 1(a) the first positive-going transition in CAUSE is at time t=30; the first positive-going transition in (EFFECT-20) is at time t=45; between these two transitions the signals are in opposite binary states, and the value of D=CAUSE−(EFFECT-I) is negative. The modulus value of CAUSE-LAST, LAST being the last position of the EFFECT pointer in the EFFECT-I data string, |30−−45|=15, is subtracted from the running total of time increments. Since the CAUSE pointer is at the earlier time, (therefore D is negative) it is updated, and the summing instruction Inc (Increment) is reversed to 'add'. The next transition in CAUSE is at time t=50; between t=50 and t=45 the signals are in the same binary state and the value D=CAUSE−(EFFECT-I) is positive. The modulus value of EFFECT-LAST, that is, the difference between the position of the EFFECT pointer and the last position of the CAUSE point |45−−50|=5, is added to the running total. The EFFECT pointer is at the earlier time (D positive) so it is updated, and the summing instruction reversed.

It will be seen from the above description that the positive or negative value of D controls which pointer is next updated. The difference in time between the pointers gives the value of the increment or decrement to the running total, and the summing instruction is reversed after each alteration to the total. If both data strings have a transition at the same time interval, then both pointers are updated but the summing instruction is not reversed.

The correct add or subtract condition of the instruction depends on an initial condition controlled by a reset signal which is generated at the start of the data collection. After the first instruction the condition is alternated.

The calculation can be made either over a fixed total time interval, or for a predetermined number of transitions.

Figure 1C:
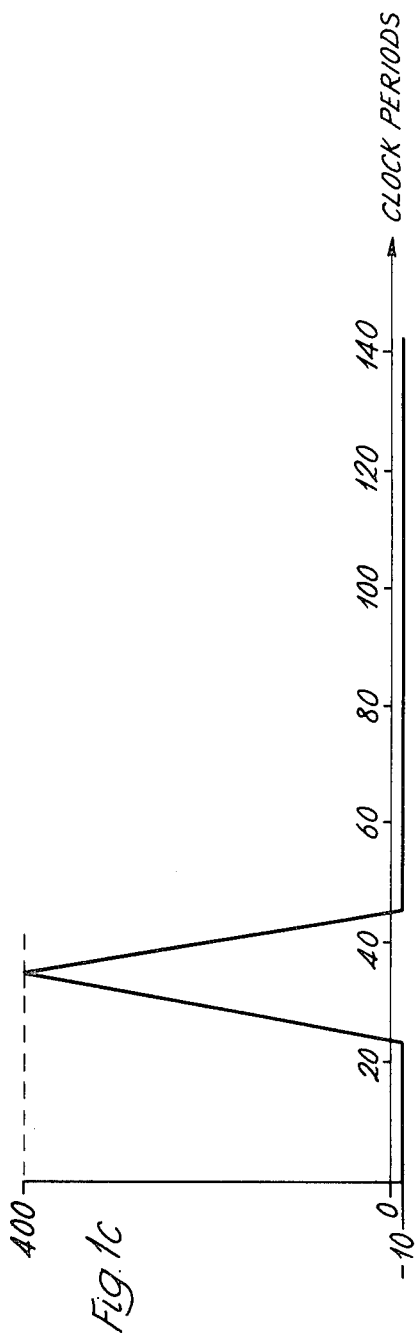

The correlation calculation is made for each selected value of I; the form of the correlation function is shown in FIG. 1(c). The peak occurs at a time corresponding to I=35, the correct transit time, and the height, +400, is the maximum possible running total, equal to the number of time intervals over which the two signals were compared. This perfect result was obtained because two pseudo random binary signals were compared. In practical situations, there will not be perfect correlation.

Apparatus for providing the signals and calculating the correlation function in accordance with the algorithm will now be described.

Figure 3:
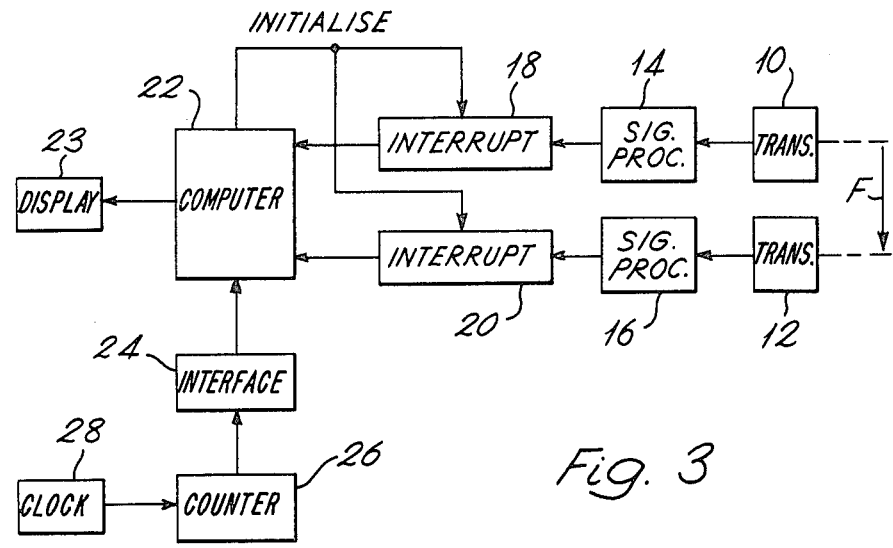
FIG. 3 shows apparatus according to the invention using interrupt circuitry.

In FIG. 3, two noise-sensing transducers 10, 12 are spaced along the direction of flow F of a flowing fluid, and are connected through respective signal processors 14, 16 and interrupt circuits 18, 20, to a computer 22. The computer is connected through an 8-bit interface 24 to a real-time 16-bit counter 26, which is fed with pulses from a clock 28. The operation rate of the counter 26 can be adjusted in accordance with the required sampling rate, and the computer 22 is connected to the interrupts 18, 20 to initialise them, that is, to start a cross correlation only on positive going transitions. The computer output is connected to a suitable display system 23.

In use, the noise signals from the transducers 10, 12 are converted by the signal processors 14, 16 to binary form, according to whether the signals are above or below a predetermined threshold which is identical for each signal. Each signal processor incorporates a zero crossing detector which provides an output pulse every time the noise signal crosses the threshold. The output pulses are sensed by the associated interrupt circuit each incorporating interrupt handler software; each pulse causes the computer to stop whatever it is doing, to read the real time counter 26, and to store the information in the CAUSE or EFFECT store, depending on which interrupt handler operated. The information in each store will then be a digital data string, as described above. Information is collected either for a preset real-time period, or until a preset number of transitions has occurred. The address for storage is also supplied by the interrupt handler software. One interrupt circuit must have higher priority than the other, as is conventional.

Figure 4:
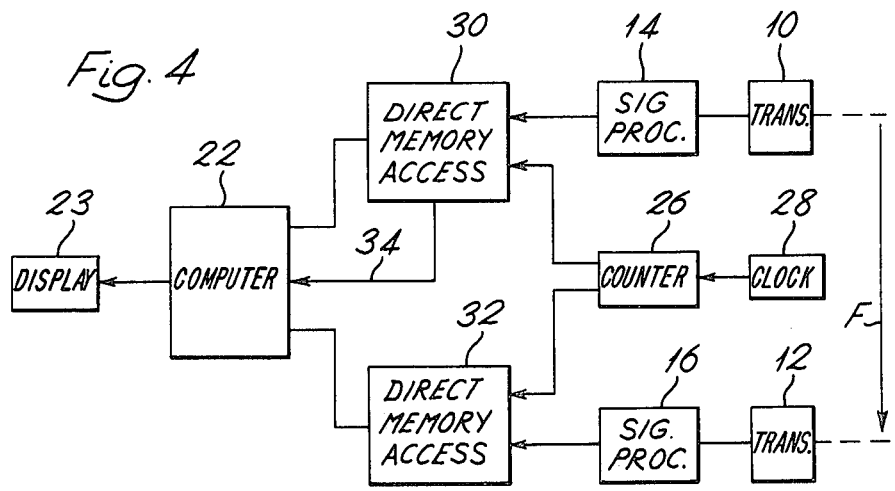
FIG. 4 shows alternative apparatus according to the invention using direct memory access.

An alternative arrangement is shown in FIG. 4, in which identical items are given the same reference numerals. The outputs of the signal processors 14, 16 are connected to respective direct memory access (DMA) circuits 30, 32 which are connected to the computer 22. The counter 26 is connected to each DMA, and one DMA also provides an interrupt signal to the computer via connection 34. In this arrangement, each DMA supplies both data and the storage address to the computer, which receives information until operation of the interrupt line 34 when the required amount of data has been stored.

Figure 5:
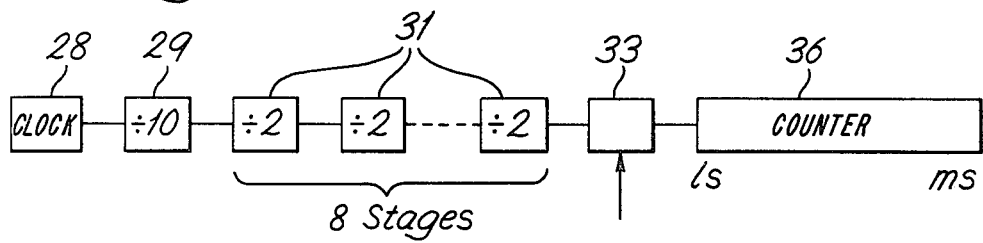
FIG. 5 shows a suitable real-time clock.

A suitable real-time counter is shown in FIG. 5. A 200 kHz square wave generator 28 is connected through a divide by 10 unit 29 and an eight-stage bistable 31 to a ripple inhibit circuit 33 (which will be described below) which controls a sixteen stage binary counter 36. The bistables can be switched in to divide the high frequency by 2 the required number of times to give a selected clock period, for example 1 millisecond.

In FIG. 6, the real-time counter 26 comprises a 16-bit counter 36 and associated AND gates 38. The most and least significant bytes are connected in parallel to the data bus 40 of the computer 22. The counter 36 is connected directly to the interrupts 18, 20 (FIG. 3) and through AND gates 48, 50 and address decoders 46, 52 to the address bus 42. The control bus 44 supplies read-/write pulses through gates 48, 50.

Figure 8:
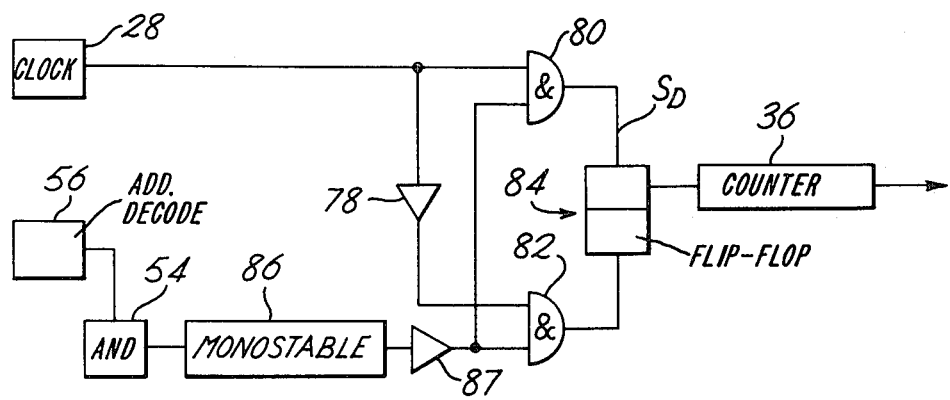
FIG. 8 shows a ripple inhibit logic circuit used to control the reading of the clock.

Since the counter 36 is a ripple-through counter, it must not be read while a ripple is passing; the counter is therefore connected to a ripple inhibit logic RIL (see FIG. 8).

In operation, when a signal is received from one of the interrupts, the least significant 8 bits of the counter are read, the most significant 8 bits are read, and the time is supplied to the data bus and stored in the computer. The address information for storage is provided either by the interrupt handler or by the DMA circuit as explained above. At the beginning of a cross correlation, there is the further function that the counter is reset to $100,000_8$ by the first address on the address bus, gated by a timing pulse, and is also arranged for the next received interrupt on each channel to be positive-going, by setting each input channel flip-flop (FIG. 7) so as to ignore negative-going signals. This prevents the correlation function from being calculated upside down.

Figure 7:
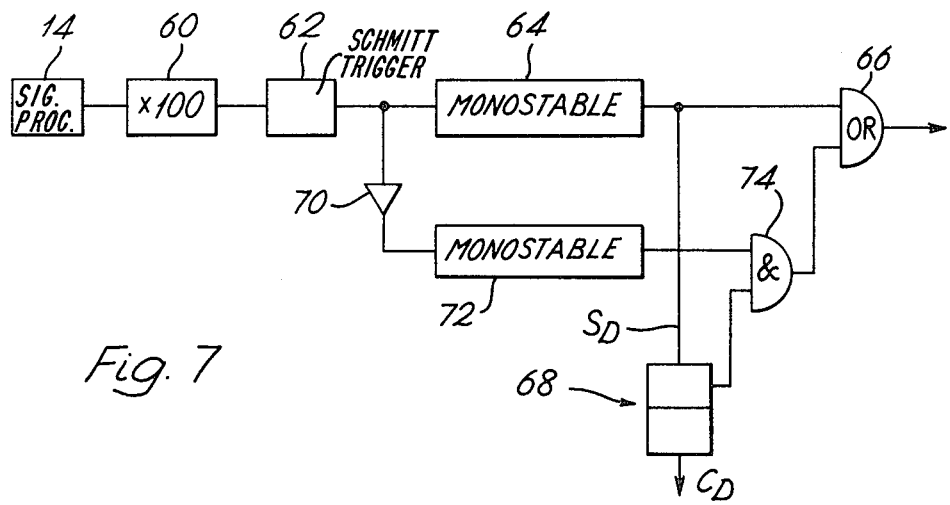
FIG. 7 shows one example of the construction of the interrupts shown in FIG. 3.

An interrupt circuit suitable for use in conjunction with the FIG. 6 circuit is illustrated in FIG. 7. One signal processor, such as 14, is connected through an amplifier 60 to a Schmitt trigger 62 having an adjustable threshold. The output of the trigger is connected through a monostable 64 to an OR gate 66 and to the set direct side of a flip-flop 68 used in a direct mode. The trigger output is also connected through an inverter 70 to a second monostable 72 which supplies one side of an AND gate 74, the other side of which is connected to the bistable, and the output of the AND gate supplies the OR gate 66.

In operation, the amplifier 60 receives a pulse from the data processor 14 and reduces the threshold limit to a lower value, usually a few millivolts. The Schmitt trigger 62 operates at its preset threshold, switching from one state to the other as the analogue signal crosses the present threshold, and sharpening the changeover. As the trigger switches, the monostable 64 converts the step to a pulse of short duration, for example 7 microseconds. It is this pulse which interrupts the computer 22 and causes the real time counter to be read. The interrupt signal is short since only a short time is needed to read the counter, considerably less than a clock period, so that no clock pulse is lost.

The second monostable and the bistable operate at the beginning of a cross correlation to allow only a positive-going transition to generate the first interrupt signal on each of the two channels.

The counter shown in FIGS. 5 and 6 includes a ripple-through counter which must not be read while a ripple is passing through it, even though this takes only about 400 nanoseconds, since an incorrect reading results. A ripple inhibit circuit, reference 33 in FIG. 5, is therefore included and is shown in detail in FIG. 8. The circuit operates so that, if the counter is being read, the next ripple is, if necessary, inhibited until the full reading has been obtained—which takes about 10 microseconds.

The 200 kHz source 28 is connected after division both directly and through an inverter 78 to two AND gates 80, 82, which supply respectively the set direct and clear direct sides of a bistable 84. The AND gates are also connected through an inverter 87, a monostable 86 and the AND gate 54 to the address decoder 56 shown in FIG. 6.

Normally, there is a logic '0' applied to the monostable 86, and the inverter supplies a logic '1' to each AND gate. The bistable 84 therefore switches at the same rate as the square wave source 28. However, if a logic '1' is applied to the monostable 86, it supplies a 10 microsecond pulse and the AND gates receive a logic '0', inhibiting any input to the bistable which remains unchanged for the required period. At the end of the pulse, the bistable switches with the source as before.

Referring again to FIG. 3, the strings of counter readings are stored in the computer, and then cross correlated in accordance with the algorithm described above (FIG. 2). The correlation function may be displayed if required, in any suitable way, e.g. on a meter, in digital form or on a cathode ray tube. The function can be normalised by dividing the number of clock pulses counted by the highest possible number, i.e. the number of clock pulses equal to the real-time logging period. Alternatively, only the flow transit time need be calculated and displayed, or the flow speed.

Apparatus according to the invention has several advantages. The reduced number of items of information may allow use of a suitable microprocessor instead of a computer. In contrast to previous correlation methods, a change in the clock rate does not alter the number of items logged, but merely changes the values of the times. For example, doubling the clock rate would alter the CAUSE data string given above to: 60, 100, 120, 180, 200 etc. The resolution, however, is doubled, without doubling the required number of calculations. Further, the selection of the shift period I is not constrained by the previous value, and I can be selected at random. This allows a quick scan across a wide correlation window to locate the region of the correlation peak, then suitable I values can be chosen to determine the peak accurately; this reduces the time needed for the computation. A further reduction in time results from the new algorithm which requires fewer computations than, for example, a conventional convolution type algorithm. Another advantage is that, by logging a certain number of transitions, instead of logging for a fixed time period, the repeatability is assured; in effect this is a form of adaptive control.

The invention has been described with reference to a system in which all of the required data is stored before the computation begins. It is also possible to provide apparatus arranged so that information is collected and used in a computation simultaneously.

In another modification, instead of providing a 16 stage counter as the real-time counter, an 8-stage counter may be used, with provision of an overflow detector logic, shown dotted as reference 58 in FIG. 6. This may allow use of an 8-bit microprocessor, but has the contraint that there must be at least one zero crossing in each clock cycle of 256 clock pulse periods.

In yet another modification the integral clock circuit of a microprocessor can be used to generate the clock frequency, together with a programmable counter-timer circuit.

In still yet another modification the running total is incremented when the signals are in agreement but not decremented when they are in disagreement. Under these conditions a total of 50% maximum corresponds to zero correlation and a total of 0 to a maximum inverse correlation.

It is also possible to carry out two or more cross correlations from three or more data strings. The additional input channels would be identical to those shown above.

While in the above description of the apparatus only the transit time, i.e. the position of the peak of the correlation function, has been calculated, it is also possible, by wellknown modifications to the apparatus, to calculate the correlation function itself or an approximation thereof.

I claim:

1. Apparatus for comparing two binary data strings comprising:
   means for receiving said two binary data strings; and
   means for storing signals indicative of the respective times at which each of said binary data strings changes its state and generating a signal from said stored signals relating to the polarity correlation function of the two binary data strings.

2. Apparatus according to claim 1 wherein said calculating means includes counting means for counting equal increments of time and control means for changing the operation of the counting means between an addition mode and a subtraction mode whenever only one binary signal changes its state.

3. Apparatus according to claim 2 in which the increments of time between any two consecutive changes in the state of the binary data strings are added when the binary data strings are in the same state between those changes and subtracted when the states differ.

4. Apparatus according to claim 1 in which both binary data strings are derived from the same source at effectively different times, and said storing and generating means further comprises means for applying to one of the binary data strings a plurality of different time shifts, and for determining which time shift corresponds to the highest value of the polarity correlation function of the time shifted string and the other binary data string.

5. Apparatus according to claim 4 further comprising two sensing means, each of said sensing means being connected to one of said receiving means, respectively, said two sensing means being spaced in the direction of movement of a moving system, the time shift corresponding to the highest value of the polarity correlation function then being the transit time of the movement between the two positions.

6. Apparatus according to claim 1 further comprising two sensing means, each of said sensing means being connected to one of said receiving means, respectively, said sensing means for generating two noise signals, and threshold sensing means for converting each noise signal into a binary data string.

7. Apparatus for determining the transit time of a flowing fluid comprising:
   two flow sensors spaced in the direction of flow and each providing an output signal related to fluctuations in a property of the flowing fluid;
   threshold sensing means to convert each output signal to a binary signal; and
   calculating means for indicating the respective times at which each binary signal changes its state, for applying a series of time shifts to the times of change of state of one binary signal, and for adding equal increments of time between two consecutive changes of state of the one binary signal and the time shifted binary signal when the two signals are in the same state and for subtracting increments when the signals are in different states and to indicate which time shift corresponds to a maximum sum.

8. A method of comparing two binary data strings comprising the steps of:
   storing signal indicative of the respective times at which each binary signal changes its state; and
   generating a signal from said stored signals relating to the polarity correlation function of the two binary data strings.

9. A method according to claim 8 wherein:
   said storing step further comprises the step of representing said respective times in the form of respective digital data strings corresponding to numbers of time increments; and
   said generating step further comprises the steps of comparing, at each digit in each string, the states of the binary data strings between that digit and the preceding digit in either digital string and determining the numerical difference between the digits, incrementing a numerical total by the numerical difference when the binary signals are in the same state and decrementing the numerical total by the numerical difference when the binary signals are in opposite states, and comparing the final total with the total number of time increments in each digital string.

10. A method according to claim 9 wherein said method further comprising the step of deriving the two binary data strings from the same source at effectively different times; and said generating step further comprises the steps of adding to or subtracting from one digital data string each of a series of whole numbers to provide a series of time-shifted digital data strings, comparing each time shifted digital data string with the other digital data string, and determining which time shift corresponds to the highest final total.

* * * * *

UNITED STATES PATENT AND TRADEMARK OFFICE
CERTIFICATE OF CORRECTION

PATENT NO. : 4,285,046

DATED : August 18, 1981

INVENTOR(S) : Robert M. Henry

It is certified that error appears in the above—identified patent and that said Letters Patent is hereby corrected as shown below:

Column 2, line 55, beginning at the margin and before "4", insert --becomes:--.

Columns 3 and 4, lines 11-16, delete in entirety and insert therefor: --

| CAUSE | 0 | 30 | 50 | 60 | 90 | 100 | 110 | 120 | 130 | 170 | 180 |
| | 200 | 210 | 220 | 240 | 260 | 310 | 340 | 360 | 370 | 400; and |
| EFFECT | -15 | 35 | 65 | 85 | 95 | 125 | 135 | 145 | 155 | 165 | 205 |
| | 215 | 235 | 245 | 255 | 275 | 295 | 345 | 375 | 395 | 405 | 435.-- |

Column 7, lines 48 and 49, delete "calculating" and insert therefor --storing and generating--.

UNITED STATES PATENT AND TRADEMARK OFFICE
CERTIFICATE OF CORRECTION

PATENT NO. : 4,285,046
DATED : August 18, 1981
INVENTOR(S) : Robert M. Henry

It is certified that error appears in the above—identified patent and that said Letters Patent is hereby corrected as shown below:

Column 8, line 35, change "signal" to --signals--.

Signed and Sealed this

Second Day of February 1982

[SEAL]

Attest:

GERALD J. MOSSINGHOFF

Attesting Officer

Commissioner of Patents and Trademarks